United States Patent
Choi et al.

(10) Patent No.: US 11,108,046 B2
(45) Date of Patent: Aug. 31, 2021

(54) NEGATIVE ELECTRODE ACTIVE MATERIAL FOR LITHIUM SECONDARY BATTERY, NEGATIVE ELECTRODE AND LITHIUM SECONDARY BATTERY COMPRISING THE SAME

(71) Applicant: LG CHEM, LTD., Seoul (KR)

(72) Inventors: Hee Won Choi, Daejeon (KR); Dong Sub Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 97 days.

(21) Appl. No.: 16/510,064

(22) Filed: Jul. 12, 2019

(65) Prior Publication Data
US 2020/0020947 A1    Jan. 16, 2020

(30) Foreign Application Priority Data
Jul. 12, 2018   (KR) ........................ 10-2018-0081147

(51) Int. Cl.
*H01M 4/587*   (2010.01)
*H01M 10/0525*   (2010.01)
*H01M 4/02*   (2006.01)

(52) U.S. Cl.
CPC ....... *H01M 4/587* (2013.01); *H01M 10/0525* (2013.01); *H01M 2004/021* (2013.01); *H01M 2004/027* (2013.01)

(58) Field of Classification Search
CPC .............................. H01M 4/583; H01M 4/587
See application file for complete search history.

(56) References Cited

U.S. PATENT DOCUMENTS

| | | | | |
|---|---|---|---|---|
| 2009/0272945 A1* | 11/2009 | Kume | ................... | H01G 11/86 252/502 |
| 2012/0037845 A1* | 2/2012 | Yamamoto | ........ | H01M 10/0525 252/182.1 |
| 2012/0251888 A1* | 10/2012 | Yamamoto | ............ | H01M 4/131 429/231.8 |
| 2014/0080005 A1* | 3/2014 | Takahata | ............... | H01M 4/364 429/231.8 |
| 2014/0127564 A1* | 5/2014 | Han | ...................... | H01M 4/587 429/211 |
| 2014/0227588 A1* | 8/2014 | Kim | ...................... | H01M 4/625 429/188 |
| 2015/0287546 A1* | 10/2015 | Xi | .......................... | H01G 11/86 429/231.8 |
| 2016/0064727 A1* | 3/2016 | Kim | ...................... | H01M 4/364 429/163 |
| 2016/0181614 A1 | 6/2016 | Suga et al. | | |
| 2017/0110715 A1* | 4/2017 | Kajimoto | .............. | H01M 4/133 |
| 2018/0318789 A1* | 11/2018 | Stabler | ............... | B01J 20/28064 |
| 2019/0288279 A1* | 9/2019 | Xu | ........................ | H01M 4/364 |

FOREIGN PATENT DOCUMENTS

| | | | |
|---|---|---|---|
| JP | 2000-040510 A | | 2/2000 |
| JP | 4403327 B2 | | 1/2010 |
| KR | 10-2004-0098420 A | | 11/2004 |
| KR | 10-2008-0036255 A | | 4/2008 |
| KR | 10-1555502 B1 | | 9/2015 |
| KR | 20160018174 A | * | 2/2016 |
| KR | 10-2016-0025912 A | | 3/2016 |
| KR | 10-2016-0074385 A | | 6/2016 |
| KR | 10-1796819 B1 | | 11/2017 |

OTHER PUBLICATIONS

Machine Translation of KR20160018174A (Mar. 2021) (Year: 2021).*

* cited by examiner

*Primary Examiner* — Matthew J Merkling
(74) *Attorney, Agent, or Firm* — Birch, Stewart, Kolasch & Birch, LLP

(57) ABSTRACT

A negative electrode active material for a lithium secondary battery, which includes: natural graphite particles; and soft carbon particles having a BET specific surface area of 7.6 m²/g or more, wherein the natural graphite particles and the soft carbon particles are present in the negative electrode active material at a range of weight ratio of 78:22 to 92:8. Also a negative electrode containing the negative electrode active material and a lithium secondary battery containing the negative electrode.

13 Claims, No Drawings

NEGATIVE ELECTRODE ACTIVE MATERIAL FOR LITHIUM SECONDARY BATTERY, NEGATIVE ELECTRODE AND LITHIUM SECONDARY BATTERY COMPRISING THE SAME

CROSS-REFERENCE TO RELATED APPLICATION

This application claims priority to and the benefit of Korean Patent Application No. 10-2018-0081147, filed on Jul. 12, 2018, in the Korean Intellectual Property Office, the disclosure of which is incorporated herein by reference in its entirety.

BACKGROUND

1. Field of the Invention

The present invention relates to a negative electrode active material for a lithium secondary battery, a negative electrode and a lithium secondary battery including the same.

2. Discussion of Related Art

As the price for energy sources increases due to the depletion of fossil fuels and interest in environmental pollution is amplified, environmentally friendly alternative energy sources become indispensable factors for a future life.

Particularly, according to an increase in the development and demand for mobile devices, the demand for a secondary battery as an environmentally friendly alternative energy source is rapidly increasing.

While secondary batteries have used a conventional lithium metal as a negative electrode, as the risk of short circuit of the battery and the resulting explosion due to the formation of a dendrite become a problem, the use of carbon-based active materials enabling reversible intercalation and deintercalation of lithium ions and maintaining structural and electrical characteristics is emerging.

As a carbon-based active material, various types of carbon-based materials including artificial graphite and natural graphite have been applied, and among these, due to excellent reversibility, a graphite-based active material capable of ensuring the lifespan characteristic of a lithium secondary battery is most widely used. Due to the fact that the discharge voltage of the graphite-based active material, compared to lithium, is as low as −0.2V, since a battery using a graphite-based active material may exhibit a high discharge voltage of 3.6V, there are many advantages in terms of the energy density of the lithium battery.

As a carbon-based material, artificial graphite exhibits a lower capacity than natural graphite, has poor processability such as in the preparation of a negative electrode slurry and a decreased electrode adhesive strength due to formation of secondary particles and coating treatment, and has decreased electrode rollability.

On the other hand, natural graphite has high output and capacity, but there is a possibility that a swelling problem due to high orientation may occur and there are many functional groups on the surface thereof, compared to artificial graphite, and therefore high temperature characteristics are poor.

While Japanese Patent Publication No. 4403327 disclosed graphite powder for a negative electrode of a lithium ion secondary battery, it also did not provide an alternative to the above-mentioned problem.

PRIOR ART DOCUMENT

Patent Document

Japanese Patent Publication No. 4403327

SUMMARY OF THE INVENTION

One embodiment of the present invention is directed to a negative electrode active material for a lithium secondary battery, which has one or more of improved output characteristics, high temperature storage characteristics and high temperature cycle characteristics.

In addition, one embodiment of the present invention is directed to a negative electrode and a lithium secondary battery, which include the above-described negative electrode active material for a lithium secondary battery.

One embodiment of the present invention provides a negative electrode active material for a lithium secondary battery, which includes: natural graphite particles; and soft carbon particles having a BET specific surface area of 7.6 $m^2/g$ or more, wherein the natural graphite particles and the soft carbon particles are present in the negative electrode active material in a range of weight ratio of 78:22 to 92:8.

One embodiment of the present invention provides a negative electrode which includes the above-described negative electrode active material for a lithium secondary battery.

One embodiment of the present invention provides a lithium secondary battery, which includes the above-described negative electrode, a positive electrode, and a separator interposed between the negative electrode and the positive electrode.

DETAILED DESCRIPTION OF EXEMPLARY EMBODIMENTS

Terms and words used in the specification and claims should not be construed as limited to general or dictionary terms, and should be interpreted with the meaning and concept in accordance with the technical idea of the present invention based on the principle that the inventors have appropriately defined the concepts of terms in order to explain the invention in the best way.

The terms used in the specification are used only to explain specific examples, not to limit the present invention. Singular expressions include plural referents unless clearly indicated otherwise in the context.

The terms "include" and "have" used herein designate the presence of characteristics, numbers, stages, components or a combination thereof, and it should be understood that the possibility of the presence or addition of one or more other characteristics, numbers, stages, components, or a combination thereof is not excluded in advance.

The average particle diameter ($D_{50}$) in the specification may be defined as a particle size corresponding to 50% of volume accumulation in the particle diameter distribution curve of particles. The average particle diameter ($D_{50}$) may be measured using, for example, a laser diffraction method. The laser diffraction method can be used to measure a particle diameter in the range from submicrons to several micrometers, and may obtain results with high reproducibility and high degradability.

In the specification, a BET specific surface area may be measured by a Brunauer-Emmett-Teller (BET) method. For example, a BET specific surface area may be measured by a BET 6-point method according to a nitrogen gas adsorption flow-method using a porosimetry analyzer (Belsorp-II mini, Bell Japan Inc.).

Hereinafter, the present invention will be described in detail.

To improve one or more of output characteristics, high temperature storage characteristics and high temperature cycle characteristics of a battery, a negative electrode active material for a lithium secondary battery, in which two different types of negative electrode active material particles are mixed, and a negative electrode including the same are provided.

In addition, the present invention provides a lithium secondary battery including the negative electrode.

Negative Electrode Active Material for Lithium Secondary Battery

One embodiment of the present invention relates to a negative electrode active material for a lithium secondary battery, and specifically, the negative electrode active material for a lithium secondary battery includes: (A) natural graphite particles; and (B) soft carbon particles having a BET specific surface area of 7.6 $m^2/g$ or more, wherein the natural graphite particles and the soft carbon particles are present in the negative electrode active material at a range of weight ratio of 78:22 to 92:8.

(A) Natural Graphite Particles

A negative electrode active material for a lithium secondary battery according to one embodiment of the present invention may include natural graphite particles. The natural graphite particles are included in a negative electrode active material for a lithium secondary battery, and thus one or more of excellent output performance and capacity characteristic may be imparted to the negative electrode active material for a lithium secondary battery.

The natural graphite particles may be preferable due to their excellent output and capacity, compared to artificial graphite particles. In addition, in the present invention, since relatively soft natural graphite particles and relatively hard soft carbon particles are blended, rolling performance may be improved, and since there is little change in the specific surface area of the negative electrode in rolling, an effect of reducing lithium ion transfer resistance may be improved. If artificial (rather than natural) graphite particles and soft carbon particles are blended, it may be difficult to ensure an effect of improving one or more of output and capacity characteristics according to the present invention, and all of these particles are hard, and therefore, the above-described effect of improving rolling performance may not be obtained.

The natural graphite particles may have an average particle diameter ($D_{50}$) of 12 μm to 20 μm, preferably, 14 μm to 18 μm. Since the natural graphite particles have the above range of average particle diameter ($D_{50}$) of 12 μm to 20 μm, they may exhibit excellent output and capacity characteristics, and may be preferable for improvement of rollability when blended with soft carbon particles to be described below.

The natural graphite particles may have a BET specific surface area of 2 $m^2/g$ to 9 $m^2/g$, preferably, 2.5 $m^2/g$ to 5.5 $m^2/g$, and more preferably, 3 $m^2/g$ to 5 $m^2/g$, and the above range of 2 $m^2/g$ to 9 $m^2/g$ may be preferable in that an output characteristic and high temperature durability may be improved, and the charge/discharge efficiency of a battery may be improved.

The natural graphite particles may be spherical natural graphite particles. When the natural graphite particles are spherical, it may be preferable for improvement of rollability, and a reduction in lithium-ion or charge transfer resistance. In addition, the spherical particles may further increase a tap density, and therefore, the adhesive strength to an electrode current collector may be improved.

In the specification, the sphere or spherical shape will be understood to include almost spherical shapes as well as a complete sphere. Here, the substantial spherical shape will be understood as a concept that the particles have a substantially spherical shape or slightly distorted spherical shape.

(B) Soft Carbon Particles

The negative electrode active material for a lithium secondary battery according to the present invention includes soft carbon particles.

The soft carbon particles may have a BET specific surface area of 7.6 $m^2/g$ or more.

Generally, soft carbon particles have high output performance, but have problems of low initial efficiency and a small lithium ion storage capacity. In addition, soft carbon particles having a relatively low BET specific surface area of less than 7.6 $m^2/g$ exhibit low performance in high temperature characteristics due to excessively concentrated side reactions with an electrolyte solution in a specific area.

However, the soft carbon particles according to the present invention have a high BET specific surface area of 7.6 $m^2/g$ or more, and thus the lithium ion transfer resistance may be effectively reduced. In addition, when blended with the natural graphite particles, the output characteristic of a battery may be further improved.

In addition, as the soft carbon particles having a high BET specific surface area of 7.6 $m^2/g$ or more are included in the negative electrode active material for a lithium secondary battery, decreases in high temperature storage characteristics and high temperature cycle characteristics because the side reactions with an electrolyte solution at room temperature or a high temperature are concentrated at a specific position may be prevented. In addition, when a lithium secondary battery is operated, in an active material (e.g., a lithium composite transition metal oxide, etc.) of a counter electrode (positive electrode), a transition metal (e.g., manganese (Mn) etc.) is decomposed and thus precipitated on the surface of a negative electrode, and since the negative electrode active material for a lithium secondary battery includes soft carbon particles having a high BET specific surface area of 7.6 $m^2/g$ or more, it can prevent a phenomenon in which the transition metal is excessively concentrated and precipitated at a specific position. As a result, the lithium secondary battery to which the negative electrode active material for a lithium secondary battery of the present invention is applied may be significantly improved in one or more of high temperature storage characteristics and high temperature cycle characteristics.

To prevent a possibility of decreasing high temperature durability due to an excessively large specific surface area, as well as to more preferably realize the above-described effect, the soft carbon particles may have a BET specific surface area of 7.6 m$^2$/g to 17 m$^2$/g, preferably, 7.6 m$^2$/g to 15 m$^2$/g, and more preferably, 10 m$^2$/g to 13 m$^2$/g.

The soft carbon particles may or may not have a coating layer substantially formed on the surface thereof. The soft carbon particles that do not have a coating layer on the surface thereof may lower the irreversible capacity of an active material, and may improve energy density. In addition, when the soft carbon particles do not include a coating layer, they are preferable in an aspect that the above-described range of BET specific surface area can be realized.

The soft carbon particles may have an average particle diameter ($D_{50}$) of 6 μm to 15 μm, preferably, 9 μm to 13 μm. When the soft carbon particles have the above range of average particle diameter ($D_{50}$) of 6 μm to 15 μm, the effect of reducing lithium ion resistance may be effectively exhibited, and it may be preferable for improvement in blendability with the above-described natural graphite particles and rollability.

The soft carbon particles may be spherical soft carbon particles. When the soft carbon particles are spherical, it may be preferable for improvement in rollability and the decrease in lithium-ion or charge transfer resistance and the effect of controlling the precipitation of a transition metal from a counter electrode may be realized in a more preferable manner.

The soft carbon particles may be amorphous carbon which is prepared by carbonizing one or more selected from the group consisting of petroleum coke, coal coke, coal pitch, petroleum pitch, mesophase pitch and mesocarbon microbeads in a temperature range from 1,000 to 1,400° C.

The soft carbon particles may be prepared by thermally reacting any one or more selected from the group consisting of petroleum coke, coal coke, coal pitch, petroleum pitch, mesophase pitch and mesocarbon microbeads as a raw material in a specific temperature range. For example, the soft carbon particles may be prepared by pulverizing any one or more raw materials selected from the group consisting of petroleum coke, coal coke, coal pitch, petroleum pitch, mesophase pitch and mesocarbon microbeads to a desired particle diameter, and thermally treating the resulting product at 1,000 to 1,400° C. The pulverization may be performed using various pulverization methods conventionally used in the art without particular limitation, but a ball mill, a vortex-type grinder or a trituration-type grinder may be used.

The natural graphite particles and the soft carbon particles may be included at a range of weight ratio of 78:22 to 92:8, preferably, 80:20 to 87:13, and more preferably, 82:18 to 87:13. When the natural graphite particles and the soft carbon particles are included at the above range of weight ratio of 78:22 to 92:8, a battery may exhibit one or more of excellent output characteristic, high temperature storage characteristics and high temperature cycle characteristics.

In the negative electrode active material for a lithium secondary battery, when the natural graphite particles are included at less than 78 wt %, and the soft carbon particles are included at more than 22 wt %, the output improvement effect caused by the natural graphite particles may be insignificant, and the capacity may be reduced. When the natural graphite particles are included at more than 92 wt %, and the soft carbon particles are included at less than 8 wt %, the improvement in output of the soft carbon particles, the control of the precipitation of a counter electrode transition metal, and an effect of preventing the side reaction of an electrolyte solution may not be exhibited effectively.

In addition, in the negative electrode active material for a lithium secondary battery, the natural graphite particles are relatively soft particles, and the soft carbon particles are relatively hard particles. Therefore, as the soft particles and the hard particles are blended in the above-described range of weight ratio of 78:22 to 92:8, the improvement in rolling performance and the decrease in lithium ion transfer resistance may be additionally exhibited, high temperature storage performance may be improved to an excellent level by minimizing the change in specific surface area of a negative electrode during rolling. When the weight ratio is beyond the above-described range of 78:22 to 92:8, the lithium ion transfer resistance of the blended particles may be rapidly increased, the battery characteristics may be decreased due to damage to the particles, and/or processability in rolling and the like may be drastically decreased.

The average particle diameter ($D_{50}$) of the natural graphite particles may be larger than that of the soft carbon particles. Specifically, a difference in average particle diameter ($D_{50}$) between the natural graphite particles and the soft carbon particles may be 3 μm or more, and more specifically, 5 μm or more. When the difference in average particle diameter ($D_{50}$) between the natural graphite particles and the soft carbon particles is adjusted to the above-described range of 3 μm or more, since the natural graphite particles having excellent output and capacity characteristics have a relatively large particle diameter, the output and capacity characteristics of a battery may be exhibited at a more excellent level, and the soft carbon particles which are relatively hard and have a relatively small particle diameter may be arranged while surrounding the natural graphite particles having a large particle diameter, thereby improving rolling performance.

Negative Electrode

In addition, the present invention provides a negative electrode including the above-described negative electrode active material for a lithium secondary battery, and specifically, a negative electrode for a lithium secondary battery.

Specifically, the negative electrode of the present invention includes: a negative electrode current collector; and a negative electrode material layer (e.g., a negative electrode composite material layer) formed on the negative electrode current collector, wherein the negative electrode composite material layer includes the above-described negative electrode active material for a lithium secondary battery.

The negative electrode current collector may generally have a thickness of 3 μm to 500 μm. This negative electrode current collector is not particularly limited as long as it has high conductivity, without causing a chemical change in a battery, and may be, for example, copper, stainless steel, aluminum, nickel, titanium, calcined carbon, copper or stainless steel whose surface is treated with carbon, nickel, titanium or silver or an aluminum-cadmium alloy. In addition, like the positive electrode current collector, fine irregularities may be formed on the current collector surface to enhance the binding force of the negative electrode active material, and the negative electrode current collector may be used in various forms of a film, a sheet, a foil, a net, a porous body, foam, a non-woven fabric, etc.

The negative electrode composite material layer includes the above-described negative electrode active material for a lithium secondary battery.

The negative electrode composite material layer may further include other active materials known in the art without inhibiting the effect of the present invention, specifically, one or two or more negative electrode active materials selected from the group consisting of: a carbonaceous material; a metal such as lithium-containing titanium composite oxide (LTO), Si, Sn, Li, Zn, Mg, Cd, Ce, Ni or Fe; an alloy of the metals; an oxide of the metal; and a composite of the metal and carbon, in addition to the above-described negative electrode active material for a lithium secondary battery.

The negative electrode active material may be included at 80 to 99 wt % with respect to the total weight of the negative electrode composite material.

In addition, the negative electrode composite material layer of the present invention may further include, selectively, at least one additive selected from the group consisting of a binder, a thickening agent and a conductive agent.

The binder is a component that may help in binding between a conductive agent, an active material and a current collector, and may be generally added at 1 to 30 wt % with respect to the total weight of the negative electrode material. Examples of the binder may include polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene terpolymer (EPDM), a sulfonated-EPDM, styrene-butadiene rubber, fluorine rubber, and various copolymers thereof.

The thickening agent may be any one that can be used in a conventional lithium secondary battery, and is, for example, CMC.

The conductive agent is a component for further improving the conductivity of a negative electrode active material, and may be added at 1 to 20 wt % with respect to the total weight of the negative electrode composite material. The conductive agent is not particularly limited as long as it does not cause a chemical change in a battery, and has conductivity, and may be, for example: graphite such as natural graphite or artificial graphite; carbon black such as acetylene black, Ketjen black, channel black, furnace black, lamp black or thermal black; a conductive fiber such as a carbon fiber or a metal fiber; a metal powder such as fluorocarbon powder, aluminum powder, or nickel powder; a conductive whisker such as zinc oxide or potassium titanate; a conductive metal oxide such as titanium oxide; or a conductive material such as a polyphenylene derivative. Specific examples of commercially available conductive agent include the acetylene black series (Chevron Chemical Company, Denka Black (Denka Singapore Private Limited), products of Gulf Oil Company, etc.), Ketjen black, the EC series (products of Armak Company and Vulcan XC-72 (Cabot Company)) Super P (TIMCAL) and Super C65 (TIMCAL).

The solvent may include water or an organic solvent such as N-methyl-2-pyrrolidone (NMP), and may be used at an amount to have a preferable viscosity when the negative electrode active material, and selectively a binder and a conductive agent are included. For example, the solvent may be included such that the concentration of the solid content including the negative electrode active material, and selectively the binder and the conductive agent is 50 to 95 wt %, and preferably 70 to 90 wt %.

Lithium Secondary Battery

In addition, the present invention provides a lithium secondary battery including the above-described negative electrode.

The lithium secondary battery may include: the above-described negative electrode; a positive electrode; and a separator interposed between the negative electrode and the positive electrode.

Specifically, the lithium secondary battery of the present invention may be manufactured by injecting a non-aqueous electrolyte solution into an electrode assembly including of a positive electrode, a negative electrode and a separator interposed between the negative electrode and the positive electrode. Here, the non-aqueous electrolyte solution, the positive electrode and the separator constituting the electrode structure may be those generally used in the manufacture of a lithium secondary battery, while the negative electrode is that as described herein.

Here, the positive electrode may be produced by coating a positive electrode current collector with a positive electrode active material slurry including a positive electrode active material and selectively a binder, a conductive agent and a solvent, and then drying and rolling the resulting product.

The positive electrode current collector is not particularly limited as long as it has conductivity without causing a chemical change in a battery, and for example, stainless steel, aluminum, nickel, titanium, calcined carbon, or aluminum or stainless steel whose surface is treated with carbon, nickel, titanium or silver may be used.

The positive electrode active material may be a compound enabling reversible intercalation and deintercalation of lithium, which may specifically include a lithium composite metal oxide including lithium and one or more types of metals selected from cobalt, manganese, nickel and aluminum. More specifically, the lithium composite metal oxide may be a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), a lithium-nickel-cobalt-based oxide (e.g., $LiNi_{1-Y1}Co_{Y1}O_2$ (where $0<Y1<1$), etc.), a lithium-manganese-cobalt-based oxide (e.g., $LiCo_{1-Y2}Mn_{Y2}O_2$ (where $0<Y2<1$), $LiMn_{2-z1}Co_{z1}O_4$ (where $0<Z1<2$), etc.), a lithium-nickel-manganese-cobalt-based oxide (e.g., $Li(Ni_pCo_qMn_{r1})O_2$ (where $0<p<1$, $0<q<1$, $0<r1<1$, $p+q+r1=1$) or $Li(Ni_{p1}Co_{q1}Mn_{r2})O_4$ (where $0<p1<2$, $0<q1<2$, $0<r2<2$, $p1+q1+r2=2$), etc.), or a lithium-nickel-cobalt-transition metal (M) oxide (e.g., $Li(Ni_{p2}Co_{q2}Mn_{r3}M_{S2})O_2$ (where M is selected from the group consisting of Al, Fe, V, Cr, Ti, Ta, Mg and Mo, each of p2, q2, r3 and s2 is the atomic fraction of elements which are independent of one another, and $0<p2<1$, $0<q2<1$, $0<r3<1$, $0<s2<1$, $p2+q2+r3+s2=1$), etc.), which may be used alone or in combination of two or more thereof. Among these, to increase the capacity characteristics and stability of a battery, the lithium composite metal oxide may be $LiCoO_2$, $LiMnO_2$, $LiNiO_2$, a lithium nickel-manganese-cobalt oxide (e.g., $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$, etc.), or a lithium nickel-cobalt-aluminum oxide (e.g., $Li(Ni_{0.8}Co_{0.15}Al_{0.05})O_2$, etc.), and in consideration of significant improvement caused by control of the type and content ratio of constituent elements for forming a lithium composite metal oxide, the lithium composite metal oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$ or $Li(Ni_{0.8}Mn_{0.1}Co_{0.1})O_2$, which may be used alone or in a mixture of two or more thereof.

Preferably, the positive electrode active material may include manganese (Mn) as a transition metal. Specifically, the positive electrode active material may include a lithiummanganese-based oxide, a lithium-nickel-manganese-based oxide, and a lithium-nickel-manganese-cobalt-based oxide, and more specifically, may be $LiMnO_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$ or $Li(Ni_{0.8}Mn_{0.1}Co_{0.1})O_2$, or a combination of two or more thereof.

More preferably, to sufficiently ensure a capacity and an energy density and improve the stability of the positive electrode active material, the positive electrode active material may include $LiMnO_2$ and $Li(Ni_{0.6}Mn_{0.2}Co_{0.2})O_2$. Specifically, the positive electrode active material may include $LiMnO_2$ and $Li(Ni_{0.6}Mn_{0.2}Co_{0.2})O_2$ at a range of weight ratio of 30:70 to 70:30, and preferably, 40:60 to 60:40.

By including manganese in the positive electrode active material, it may have advantages of improving the stability of the active material, resulting in improving the stability of a battery. However, in a battery manufactured using the positive electrode manufactured of a manganese-containing positive electrode active material and a conventional negative electrode, during rapid charging, manganese is eluted and precipitated on the negative electrode, resulting in reducing the stability of the battery, and decreasing the capacity.

However, the negative electrode active material of the present invention includes natural graphite particles and soft carbon particles with a high BET specific surface area of 7.6 $m^2/g$ or more, and thus although manganese is eluted, concentration on a specific area of the surface of the negative electrode and precipitation may be effectively prevented. Accordingly, one or more of the stability, high temperature storage characteristics, and high temperature cycle characteristics of the battery may be significantly improved, and rapid charging may be easily performed.

The positive electrode active material may be included at 80 to 99 wt % with respect to the total weight of the positive electrode composite material.

The binder of the positive electrode composite material is a component helping in binding between an active material and a conductive agent and binding to the current collector, and generally, is added at 1 to 30 wt % with respect to the total weight of the positive electrode composite material. Examples of the binder may include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene terpolymer (EPDM), a sulfonated-EPDM, styrene-butadiene rubber, fluorine rubber, and various copolymers thereof.

The conductive agent may be generally added at 1 to 30 wt % with respect to the total weight of the positive electrode composite material.

The conductive agent is not particularly limited as long as it imparts conductivity without inducing a chemical change in a battery, and may be, for example: graphite; a carbon-based material such as carbon black, acetylene black, Ketjen black, channel black, furnace black, lamp black or thermal black; a conductive fiber such as a carbon fiber or a metal fiber; metal powder such as fluorocarbon powder, aluminum powder, or nickel powder; a conductive whisker consisting of zinc oxide or potassium titanate; a conductive metal oxide such as titanium oxide; or a conductive material such as a polyphenylene derivative. Specific examples of commercially available conductive agent include the acetylene black series (Chevron Chemical Company, Denka Black (Denka Singapore Private Limited), products of Gulf Oil Company, etc.), Ketjen black, the EC series (products of Armak Company and Vulcan XC-72 (Cabot Company)), Super P (TIMCAL) and Super C65 (TIMCAL).

The solvent may be an organic solvent such as N-methyl-2-pyrrolidone (NMP), and may be used at an amount to have a preferable viscosity when the positive electrode active material, and selectively a binder and a conductive agent are included. For example, the solvent may be included such that the concentration of a solid content including a positive electrode active material, and selectively a binder and a conductive agent is 50 to 95 wt %, and preferably 70 to 90 wt %.

In the lithium secondary battery, the separator separates a negative electrode from a positive electrode and provides a movement path for lithium ions, and is not specifically limited as long as it can be used as a separator in a general secondary battery, and particularly, has low resistance to ion mobility of an electrolyte and an excellent electrolyte uptake ability. Specifically, a porous polymer film, for example, a porous polymer film formed of a polyolefin-based polymer such as an ethylene homopolymer, a propylene homopolymer, an ethylene/butene copolymer, an ethylene/hexene copolymer and an ethylene/methacrylate copolymer, or a stacked structure including two or more layers thereof may be used as a separator. In addition, a conventional porous non-woven fabric, for example, a non-woven fabric formed of a high melting point glass fiber or a polyethylene terephthalate fiber may be used. In addition, a coated separator including a ceramic component or a polymer material may be used to ensure thermal resistance or mechanical strength, and may be selectively used in a single- or multi-layered structure.

In addition, the electrolyte used in the present invention may be an organic liquid electrolyte, an inorganic liquid electrolyte, a solid polymer electrolyte, a gel-type polymer electrolyte, a solid inorganic electrolyte, or a molten-type inorganic electrolyte, which can be used in manufacture of a lithium secondary battery, but the present invention is not limited thereto.

Specifically, the electrolyte may include an organic solvent and a lithium salt.

The organic solvent is not particularly limited as long as it can serve as a medium enabling the mobility of ions involved in an electrochemical reaction of a battery. Specifically, the organic solvent may be: an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC); an alcohol-based solvent such as ethyl alcohol or isopropyl alcohol; a nitrile-based solvent such as R—CN (R is a linear, branched or cyclic $C_2$ to $C_{20}$ hydrocarbon group, and may include a double bonded aromatic ring or an ether bond); an amide-based solvent such as dimethylformamide; a dioxolane-based solvent such as 1,3-dioxolane; or a sulfolane-based solvent. Among these, a carbonate-based solvent may be preferably used, and a mixture of a cyclic carbonate having high ion conductivity and high permittivity to increase the charge/discharge performance of a battery (for example, ethylene carbonate or propylene carbonate) and a low-viscosity linear carbonate-based compound (for example, ethyl methyl carbonate, dimethyl carbonate or diethyl carbonate) may be more preferably used. In this case, by using a mixture of a cyclic carbonate and a chain-type carbonate in a volume ratio of about 1:1 to about 1:9, the electrolyte solution may exhibit excellent performance.

The lithium salt is not particularly limited as long as it is a compound capable of providing lithium ions used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, or $LiB(C_2O_4)_2$. The concentration of the lithium salt may be preferably in the range of 0.1 to 2.0 M. When the concentration of the lithium salt is included in the above-mentioned range of 0.1 to 2.0 M, the electrolyte may have suitable conductivity and viscosity and thus can exhibit excellent electrolytic performance. Therefore, lithium ions can be effectively transferred.

As described above, since the lithium secondary battery according to the present invention may stably exhibit one or more of excellent discharge capacity, a rapid charging characteristic and an excellent capacity retention rate, it is useful in the field of portable devices such as a mobile phone, a notebook computer, a digital camera, etc., and an electrical automobile field including a hybrid electric vehicle (HEV), and particularly, preferably may be used as a constituent battery for medium-to-large battery modules. Therefore, the present invention also provides a medium-to-large battery module including the above-described secondary battery as a unit battery.

The medium-to-large battery module is preferably applied to a power source requiring a high output and a large capacity, for example, an electric car, a hybrid electric car, or a power storage device.

Hereinafter, the present invention will be described in detail with reference to examples so that those of ordinary skill in the art can easily carry out the present invention. However, the present invention may be embodied in a variety of different forms and is not limited to the following examples.

EXAMPLE 1: PREPARATION OF NEGATIVE ELECTRODE ACTIVE MATERIAL FOR LITHIUM SECONDARY BATTERY

A negative electrode active material for a lithium secondary battery of Example 1 was prepared by mixing spherical natural graphite particles having an average particle diameter ($D_{50}$) of 17 μm and a specific surface area of 4 $m^2/g$ and spherical soft carbon particles having an average particle diameter ($D_{50}$) of 12 μm and a specific surface area of 12 $m^2/g$ in a weight ratio of 90:10.

EXAMPLE 2: PREPARATION OF NEGATIVE ELECTRODE ACTIVE MATERIAL FOR LITHIUM SECONDARY BATTERY

A negative electrode active material for a lithium secondary battery of Example 2 was prepared by mixing the spherical natural graphite particles and the spherical soft carbon particles, which were used in Example 1, in a weight ratio of 85:15.

EXAMPLE 3: PREPARATION OF NEGATIVE ELECTRODE ACTIVE MATERIAL FOR LITHIUM SECONDARY BATTERY

A negative electrode active material for a lithium secondary battery of Example 3 was prepared by mixing the spherical natural graphite particles and the spherical soft carbon particles, which were used in Example 1, in a weight ratio of 80:20.

EXAMPLE 4: PREPARATION OF NEGATIVE ELECTRODE ACTIVE MATERIAL FOR LITHIUM SECONDARY BATTERY

A negative electrode active material for a lithium secondary battery of Example 4 was prepared by mixing the spherical natural graphite particles of Example 1 and spherical soft carbon particles having an average particle diameter ($D_{50}$) of 12 μm and a specific surface area of 8 $m^2/g$ in a weight ratio of 85:15.

EXAMPLE 5: PREPARATION OF NEGATIVE ELECTRODE ACTIVE MATERIAL FOR LITHIUM SECONDARY BATTERY

A negative electrode active material for a lithium secondary battery of Example 5 was prepared by mixing the spherical natural graphite particles of Example 1 and spherical soft carbon particles having an average particle diameter ($D_{50}$) of 12 μm and a specific surface area of 16 $m^2/g$ in a weight ratio of 85:15.

EXAMPLE 6: PREPARATION OF NEGATIVE ELECTRODE ACTIVE MATERIAL FOR LITHIUM SECONDARY BATTERY

A negative electrode active material for a lithium secondary battery of Example 6 was prepared by mixing spherical natural graphite particles having an average particle diameter ($D_{50}$) of 12 μm and a specific surface area of 8 $m^2/g$ and spherical soft carbon particles having an average particle diameter ($D_{50}$) of 14 μm and a specific surface area of 12 $m^2/g$ in a weight ratio of 85:15.

COMPARATIVE EXAMPLE 1: PREPARATION OF NEGATIVE ELECTRODE ACTIVE MATERIAL FOR LITHIUM SECONDARY BATTERY

Only the spherical natural graphite particles of Example 1 were used as a negative electrode active material for a lithium secondary battery of Comparative Example 1.

COMPARATIVE EXAMPLE 2: PREPARATION OF NEGATIVE ELECTRODE ACTIVE MATERIAL FOR LITHIUM SECONDARY BATTERY

A negative electrode active material for a lithium secondary battery of Comparative Example 2 was prepared by mixing the spherical natural graphite particles and spherical soft carbon particles, which were used in Example 1, in a weight ratio of 95:5.

COMPARATIVE EXAMPLE 3: PREPARATION OF NEGATIVE ELECTRODE ACTIVE MATERIAL FOR LITHIUM SECONDARY BATTERY

A negative electrode active material for a lithium secondary battery of Comparative Example 3 was prepared by mixing the spherical natural graphite particles and the spherical soft carbon particles, which were used in Example 1, in a weight ratio of 75:25.

COMPARATIVE EXAMPLE 4: PREPARATION OF NEGATIVE ELECTRODE ACTIVE MATERIAL FOR A LITHIUM SECONDARY BATTERY

Only spherical artificial graphite particles having an average particle diameter ($D_{50}$) of 17 μm were used as a negative electrode active material for a lithium secondary battery of Example 4.

COMPARATIVE EXAMPLE 5: PREPARATION OF NEGATIVE ELECTRODE ACTIVE MATERIAL FOR LITHIUM SECONDARY BATTERY

A negative electrode active material for a lithium secondary battery of Comparative Example 5 was prepared by mixing the spherical artificial graphite particles of Comparative Example 4 and the spherical soft carbon particles of Example 1 in a weight ratio of 90:10.

COMPARATIVE EXAMPLE 6: PREPARATION OF NEGATIVE ELECTRODE ACTIVE MATERIAL FOR LITHIUM SECONDARY BATTERY

A negative electrode active material for a lithium secondary battery of Comparative Example 6 was prepared by mixing the spherical artificial graphite particles of Comparative Example 4 and the spherical soft carbon particles of Example 1 in a weight ratio of 85:15 using the same method as described in Example 1.

COMPARATIVE EXAMPLE 7: PREPARATION OF NEGATIVE ELECTRODE ACTIVE MATERIAL FOR LITHIUM SECONDARY BATTERY

A negative electrode active material for a lithium secondary battery of Comparative Example 7 was prepared by the same method as described in Example 1, except that the spherical natural graphite particles of Example 1 and spherical soft carbon particles having an average particle diameter ($D_{50}$) of 12 μm and a specific surface area of 5 m$^2$/g were mixed in a weight ratio of 85:15.

COMPARATIVE EXAMPLE 8: PREPARATION OF NEGATIVE ELECTRODE ACTIVE MATERIAL FOR LITHIUM SECONDARY BATTERY

A negative electrode active material for a lithium secondary battery of Comparative Example 8 was prepared by mixing the spherical natural graphite particles of Example 1 and spherical soft carbon particles having an average particle diameter ($D_{50}$) of 12 μm and a specific surface area of 7 m$^2$/g in a weight ratio of 85:15.

EXPERIMENTAL EXAMPLES

Production of Negative Electrode

A negative electrode slurry was prepared by mixing each of the negative electrode active materials prepared in Examples 1 to 6 and Comparative Examples 1 to 8, Super C65 as a conductive agent, styrene-butadiene rubber (SBR) as a binder and carboxymethyl cellulose (CMC) as a thickening agent in a weight ratio of 96.6:1:1.3:1.1, and adding water thereto.

Subsequently, a negative electrode was produced by applying the negative electrode slurry to a copper foil to a thickness of 65 μm, and performing vacuum drying at about 130° C. for 8 hours and rolling. Here, the negative electrode was produced so that a load became 4.34 mAh/cm$^2$.

Manufacture of Lithium Secondary Battery

A positive electrode was produced by preparing a positive electrode slurry by mixing LiMnO$_2$ and LiNi$_{0.6}$Co$_{0.2}$Mn$_{0.2}$O$_2$ as active materials mixed in a weight ratio of 5:5, Li-435 (Denka) as a conductive agent, a 90:10 mixture of KF9700 (Kureha) and BM-730H (Zeon) as binders, and Daicel 2200 (Daicel) as a thickening agent in a weight ratio of 96.25:1.0:1.5:1.25 and adding water, and subsequently, applying the positive electrode slurry on an aluminum foil to a thickness of 12 μm, and performing vacuum drying at about 130° C. for 8 hours and rolling. Here, the positive electrode was produced so that a load became 4.10 mAh/cm$^2$.

Each of a mono cell-type and coin cell-type full-cell secondary batteries were manufactured by interposing a polyolefin separator between the negative electrode and the positive electrode, and injecting an electrolyte solution prepared by dissolving 0.7 M LiPF$_6$ and 0.3 M LIFSI in a non-aqueous electrolyte solution solvent in which ethylene carbonate (EC) and ethyl methyl carbonate (EMC) were mixed in a volume ratio of 3:7.

1. Evaluation of Rolling Performance of Negative Electrode

In the production of negative electrodes from the negative electrode active materials for a lithium secondary battery of Examples 1 to 6 and Comparative Examples 1 8, a density (g/cc) of the negative electrode during a rolling process was calculated to evaluate the rolling performance of the negative electrode.

Specifically, a roll pressing machine equipped with an upper roll and a lower roll was used, and the rolls were non-heating roll-type straight rollers having a strength of 0.4 S or less and a HrC60 hardness. During the rolling process, a pressurizing speed was 0.3 to 2 m/s.

In the rolling process, a difference between a gap between the upper and lower rolls and a desired final thickness of the negative electrode was set to be 0% of the desired final thickness of the negative electrode, and densities of the negative electrodes of the Examples and Comparative Examples were measured. The results are shown in Table 1 below.

TABLE 1

| Classification | Examples | | | | | | Comparative Examples | | | | | | | |
|---|---|---|---|---|---|---|---|---|---|---|---|---|---|---|
| | 1 | 2 | 3 | 4 | 5 | 6 | 1 | 2 | 3 | 4 | 5 | 6 | 7 | 8 |
| Density (g/cc) (Gap 0%) | 1.59 | 1.65 | 1.62 | 1.58 | 1.53 | 1.55 | 1.37 | 1.46 | 1.40 | 1.50 | 1.35 | 1.32 | 1.10 | 1.25 |

Referring to Table 1, it can be confirmed that the lithium secondary batteries of the Examples according to the present invention in which the natural graphite particles and soft carbon particles having a particular specific surface area of 7.6 m²/g or more were blended in a specific range of weight ratio of 78:22 to 92:8 have significantly excellent rolling performance, compared to the Comparative Examples.

2. Evaluation of High Temperature Storage Characteristics of Mono Cell-Type Lithium Secondary Battery In the mono cell-type lithium secondary batteries of the Examples and Comparative Examples, the state of charge (SOC) of the battery was charged up to 100%, storage was performed at a high temperature (60° C.) for 4 weeks, and the residual capacity retention (%) and the resistance increase rate (%) were measured according to the following methods. The results are shown in Table 2 below.

Residual Capacity Retention (%) Measurement

A lithium secondary battery which was subjected to high temperature storage (60° C.) for 4 weeks was discharged at 0.33 C to calculate a discharge capacity, and a ratio (%) of the discharge capacity to the initial full-charge capacity was measured, thereby calculating residual capacity retention (%).

RESISTANCE Increase Rate (%) Measurement

A resistance of a lithium secondary battery before storage and a resistance of the lithium secondary battery after high temperature (60° C.) storage for 4 weeks were measured using a High Pulse Power Characterization (HPPC) test, and a resistance increase rate was calculated as a ratio (%) of the resistance of the lithium secondary battery in high temperature storage for 4 weeks with respect to the resistance of the lithium secondary battery before storage. The results are shown in Table 2.

Specifically, the resistance of the lithium secondary battery before storage was expressed as a value obtained by dividing a variation of voltage between charging and discharging by an applied current after the lithium secondary battery before storage was subjected to 3 cycles of charging/discharging under conditions for discharging at 0.33 C and 2.5V and charging at 0.33 C and 4.2V, discharged to SOC 50%, charged at 2.5 C for 10 minutes, rested for 30 minutes, discharged at 2.5 C for 10 minutes, and rested for 30 minutes.

In addition, the resistance of the lithium secondary battery in 4-week storage was calculated by measuring a voltage change between charging and discharging by the same method as described above, and dividing the voltage change by an applied current.

TABLE 2

| Classification | Examples | | | | | | Comparative Examples | | | | | | | |
|---|---|---|---|---|---|---|---|---|---|---|---|---|---|---|
| | 1 | 2 | 3 | 4 | 5 | 6 | 1 | 2 | 3 | 4 | 5 | 6 | 7 | 8 |
| Residual capacity retention (%) | 94.2 | 95.8 | 94.9 | 92.7 | 91.9 | 92.4 | 89.5 | 90.1 | 89.8 | 90.8 | 85.6 | 84.2 | 78.3 | 79.5 |
| Resistance increase rate (%) | 163.2 | 158.0 | 162.2 | 167.4 | 170.7 | 167.8 | 178.3 | 177.6 | 178.9 | 176.8 | 186.7 | 188.4 | 201.6 | 198.7 |

Referring to Table 2, in the Examples according to the present invention in which the natural graphite particles and the soft carbon particles were blended, since a lithium secondary battery has considerably high residual capacity retention and a low resistance increase rate in the high temperature storage, compared to the Comparative Examples, it can be seen that the high temperature storage characteristics are excellent.

In Comparative Examples 1 to 3 in which the mixing ratio of the natural graphite particles and soft carbon particles is beyond the range of 78:22 to 92:8, Comparative Examples 4 to 6 using artificial graphite particles instead of natural graphite particles, and Comparative Examples 7 and 8 in which the specific surface area of soft carbon particles used is beyond the range of 7.6 m²/g or more (e.g., less than 7.6 m²/g), it can be confirmed that the high temperature storage characteristics are considerably decreased, compared to the Examples.

3. Evaluation of High Temperature Storage Characteristic of Coin Cell-Type Lithium Secondary Battery In the above-described coin cell-type lithium secondary batteries of the Examples and Comparative Examples, the SOC of the battery was charged to SOC 95%, 4-week storage was performed at a high temperature (60° C.), and residual capacity retention (%) was measured according to the following method. The results are shown in Table 3 below.

Residual Capacity Retention (%) Measurement

After a lithium secondary battery subjected to 4-week high temperature storage was set to room temperature, 3 cycles of charging/discharging were performed at 0.1 C, and discharging was performed to SOC 5% in discharging of the third cycle, followed by calculating a discharge capacity. The residual capacity retention was calculated as a ratio (%) of a discharge capacity to a charge capacity at the initial SOC 95%.

TABLE 3

| Classification | Examples | | | | | | Comparative Examples | | | | | | | |
|---|---|---|---|---|---|---|---|---|---|---|---|---|---|---|
| | 1 | 2 | 3 | 4 | 5 | 6 | 1 | 2 | 3 | 4 | 5 | 6 | 7 | 8 |
| Residual capacity retention (%) | 92.1 | 92.4 | 92.3 | 91.5 | 90.4 | 91.3 | 86.0 | 86.5 | 84.1 | 86.8 | 80.3 | 78.1 | 70.3 | 75.6 |

Referring to Table 3, as in Experimental Example 1, since the lithium secondary batteries of the Examples according to the present invention in which the natural graphite particles and the soft carbon particles were blended exhibit considerably high residual capacity retention, compared to the Comparative Examples in high temperature storage, it can be seen that the high temperature storage characteristic is excellent.

In the cases of Comparative Examples 1 to 3 in which the range of mixing ratio of natural graphite particles and soft carbon particles was beyond the scope of 78:22 to 92:8, Comparative Examples 4 to 6 which used artificial graphite particles instead of natural graphite particles, and Comparative Examples 7 and 8 in which the specific surface area of soft carbon particles used was beyond the range of 7.6 m²/g or more (e.g., less than 7.6 m²/g), it can be confirmed that the high temperature storage characteristic is considerably lower than those of the Examples.

4. Evaluation of High Temperature Cycle Characteristics of Mono Cell-Type Lithium Secondary Battery After the mono cell-type lithium secondary batteries of the Examples and Comparative Examples were subjected to charging/discharging for 300 cycles at 45° C. under 1 C/1 C, the charge capacity retention (%) at the $300^{th}$ cycle and the discharge capacity retention (%) at the $300^{th}$ cycle were calculated according to Equations 1 and 2 below. The results are shown in Table 4 below.

Charge capacity retention (%) at $300^{th}$ cycle=Charge capacity of lithium secondary battery at $300^{th}$ cycle/Charge capacity of lithium secondary battery at first cycle×100  [Equation 1]

Discharge capacity retention (%) at $300^{th}$ cycle=Discharge capacity of lithium secondary battery at $300^{th}$ cycle/discharge capacity of lithium secondary battery at first cycle×100  [Equation 2]

TABLE 4

| Classification | Examples | | | | | | Comparative Examples | | | | | | | |
|---|---|---|---|---|---|---|---|---|---|---|---|---|---|---|
| | 1 | 2 | 3 | 4 | 5 | 6 | 1 | 2 | 3 | 4 | 5 | 6 | 7 | 8 |
| Charge capacity retention at 300th cycle (%) | 81.5 | 82.3 | 82.1 | 80.8 | 80.1 | 81.1 | 79.0 | 75.4 | 76.3 | 79.2 | 74.4 | 71.7 | 66.4 | 70.5 |
| Discharge capacity retention at 300th cycle (%) | 81.3 | 82.1 | 81.8 | 80.6 | 79.9 | 80.9 | 78.8 | 75.1 | 76.1 | 78.9 | 74.2 | 71.5 | 66.2 | 70.2 |

Referring to Table 4, as in Experimental Example 1, it can be confirmed that the lithium secondary batteries of Examples according to the present invention in which natural graphite particles and soft carbon particles were blended exhibit excellent cycle characteristics at high temperature, compared to the Comparative Examples.

5. Evaluation of Output Characteristic of Mono Cell-Type Lithium Secondary Battery After the mono cell-type lithium secondary batteries of the Examples and Comparative Examples were set to SOC 50%, an output resistance was measured at room temperature (25° C.) according to an HPPC test method. Specifically, the output resistance was expressed as a value obtained by dividing a voltage change between charging and discharging by an applied current after a lithium secondary battery was subjected to 3 cycles of charging/discharging under conditions of discharging at 0.33 C and 2.5V and charging at 0.33 C and 4.2V, discharged to SOC 50%, charged at 2.5 C for 10 minutes, rested for 30 minutes, discharged at 2.5 C for 10 minutes and rested for 30 minutes. The results are shown in Table 5.

TABLE 5

| Classification | Examples | | | | | | Comparative Examples | | | | | | | |
|---|---|---|---|---|---|---|---|---|---|---|---|---|---|---|
| | 1 | 2 | 3 | 4 | 5 | 6 | 1 | 2 | 3 | 4 | 5 | 6 | 7 | 8 |
| Output resistance ($\Omega$, SOC 50) | 1.95 | 1.88 | 1.92 | 1.97 | 2.06 | 2.03 | 2.31 | 2.26 | 2.29 | 2.21 | 2.38 | 2.47 | 2.69 | 2.40 |

Referring to Table 5, it can be confirmed that lithium secondary batteries of the Examples according to the present invention in which the natural graphite particles and soft carbon particles having a particular specific surface area of 7.6 m$^2$/g or more were blended at a specific range of weight ratio of 78:22 to 92:8 exhibit resistance at a significantly lower level than those of the Comparative Examples, resulting in exhibiting a high output characteristic.

A negative electrode active material for a lithium secondary battery according to the present invention includes natural graphite particles and soft carbon particles with a particular specific surface area of 7.6 m$^2$/g or more blended at a specific range of weight ratio of 78:22 to 92:8. Since the soft carbon particles have a high specific surface area, they can reduce a lithium-ion or charge transfer resistance and improve an output by being blended with natural graphite particles. In addition, as the soft carbon particles have a high specific surface area, the precipitation of a transition metal of a positive electrode active material included in a positive electrode can be controlled, and a side reaction with an electrolyte solution at a high temperature can be decreased, and thus the negative electrode active material of the present invention shows improvements in one or more of high temperature storage and high temperature cycle characteristics at a high level.

In addition, the negative electrode active material for a lithium secondary battery of the present invention may have a high level of rolling performance by blending relatively soft natural graphite particles and relatively hard soft carbon particles, and can exhibit an improved effect of reducing lithium ion transfer resistance.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A negative electrode active material for a lithium secondary battery, comprising:
    natural graphite particles having a BET specific surface area of 2.5 m$^2$/g to 5.5 m$^2$/g; and
    soft carbon particles having a BET specific surface area of 10 m$^2$/g to 13 m$^2$/g,
    wherein the natural graphite particles and the soft carbon particles are present in the negative electrode active material at a range of weight ratio of 78:22 to 92:8,
    wherein the natural graphite particles have an average particle diameter (D50) of 12 μm to 20 μm, and wherein the soft carbon particles have an average particle diameter (D50) of 6 μm to 15 μm.

2. The negative electrode active material of claim 1, wherein the natural graphite particles and the soft carbon particles are present in the negative electrode active material at a range of weight ratio of 80:20 to 87:13.

3. The negative electrode active material of claim 1, wherein an average particle diameter ($D_{50}$) of the natural graphite particles is larger than an average particle diameter ($D_{50}$) of the soft carbon particles.

4. The negative electrode active material of claim 3, wherein a difference in average particle diameter ($D_{50}$) between the natural graphite particles and the soft carbon particles is 3 μm or more.

5. The negative electrode active material of claim 1, wherein the natural graphite particles are spherical natural graphite particles.

6. The negative electrode active material of claim 1, wherein the soft carbon particles are spherical soft carbon particles.

7. The negative electrode active material of claim 1, wherein the soft carbon particles are formed by carbonizing one or more selected from the group consisting of petroleum coke, coal coke, coal pitch, petroleum pitch, mesophase pitch and mesocarbon microbeads in a temperature range from 1000 to 1400° C.

8. The negative electrode active material of claim 1, wherein the soft carbon particles are formed by thermally reacting one or more selected from the group consisting of petroleum coke, coal coke, coal pitch, petroleum pitch, mesophase pitch and mesocarbon microbeads as a raw material.

9. The negative electrode active material of claim 1, wherein the soft carbon particles are amorphous carbon particles.

10. A negative electrode, comprising the negative electrode active material for a lithium secondary battery of claim 1.

11. A lithium secondary battery, comprising:
    the negative electrode according to claim 10;
    a positive electrode; and
    a separator interposed between the negative electrode and the positive electrode.

12. The lithium secondary battery of claim 11, wherein the positive electrode comprises a positive electrode active material comprising manganese.

13. The lithium secondary battery of claim 12, wherein the positive electrode active material comprises at least one selected from the group consisting of a lithium-manganese-based oxide, a lithium-nickel-manganese-based oxide, and a lithium-nickel-manganese-cobalt-based oxide.

* * * * *